United States Patent
Lipcon (10) Patent No.: US 9,600,492 B2
(45) Date of Patent: *Mar. 21, 2017

(54) DATA PROCESSING PERFORMANCE ENHANCEMENT IN A DISTRIBUTED FILE SYSTEM

(71) Applicant: Cloudera, Inc., Palo Alto, CA (US)

(72) Inventor: Todd Lipcon, San Francisco, CA (US)

(73) Assignee: Cloudera, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/225,533

(22) Filed: Aug. 1, 2016

(65) Prior Publication Data

US 2016/0342619 A1 Nov. 24, 2016

Related U.S. Application Data

(63) Continuation of application No. 13/426,466, filed on Mar. 21, 2012, now Pat. No. 9,405,692.

(51) Int. Cl.
  *G06F 7/00* (2006.01)
  *G06F 17/30* (2006.01)
  *G06F 12/08* (2016.01)
  *G06F 13/20* (2006.01)

(52) U.S. Cl.
  CPC .... *G06F 17/30194* (2013.01); *G06F 12/0871* (2013.01); *G06F 13/20* (2013.01); *G06F 2212/603* (2013.01)

(58) Field of Classification Search
  None
  See application file for complete search history.

(56) References Cited

U.S. PATENT DOCUMENTS

| | | | |
|---|---|---|---|
| 5,671,385 A * | 9/1997 | Jost | G06F 12/0866 711/114 |
| 5,737,536 A * | 4/1998 | Herrmann | G09G 5/393 707/E17.005 |
| 5,825,877 A | 10/1998 | Dan et al. | |
| 6,209,058 B1 * | 3/2001 | Shats | G06F 12/0866 360/71 |
| 6,553,476 B1 * | 4/2003 | Ayaki | G06F 3/0601 386/E5.042 |
| 6,678,828 B1 | 1/2004 | Pham et al. | |

(Continued)

OTHER PUBLICATIONS

Babaoglu, O., and K. Marzullo, "Consistent global states of distributed systems: Fundamental concepts and mechanisms," Distributed Systems, 53 pages, Jan. 1993.

(Continued)

*Primary Examiner* — Debbie Le
*Assistant Examiner* — Hasanul Mobin
(74) *Attorney, Agent, or Firm* — Perkins Coie LLP (57) ABSTRACT

Systems and methods of data processing performance enhancement are disclosed. One embodiment includes, invoking operating system calls to optimize cache management by an I/O component; wherein, the operating system calls are invoked to perform one or more of; proactive triggering of readaheads for sequential read requests of a disk; purging data out of buffer cache after writing to the disk or performing sequential reads from the desk; and/or eliminating a delay between when a write is performed and when written data from the write is flushed to the disk from the buffer cache.

21 Claims, 7 Drawing Sheets

(56) References Cited

U.S. PATENT DOCUMENTS

| | | |
|---|---|---|
| 6,910,099 B1 | 6/2005 | Wang et al. |
| 6,931,530 B2 | 8/2005 | Pham et al. |
| 7,143,288 B2 | 11/2006 | Pham et al. |
| 8,024,560 B1 | 9/2011 | Alten |
| 8,306,919 B2 | 11/2012 | Sakamura et al. |
| 8,489,820 B1* | 7/2013 | Ellard ............... G06F 12/0246 711/120 |
| 8,667,267 B1 | 3/2014 | Garcia et al. |
| 8,732,406 B1* | 5/2014 | Pase ................ G06F 12/0862 711/113 |
| 8,788,815 B1 | 7/2014 | Garcia et al. |
| 8,821,602 B2 | 9/2014 | McAlister |
| 2002/0073322 A1 | 6/2002 | Park et al. |
| 2004/0034746 A1* | 2/2004 | Horn ................. G06F 12/0866 711/141 |
| 2005/0044311 A1* | 2/2005 | Lahiri ............... G06F 12/0804 711/113 |
| 2005/0091244 A1* | 4/2005 | Marcotte ............... G06F 9/544 |
| 2005/0171983 A1 | 8/2005 | Deo et al. |
| 2005/0182749 A1 | 8/2005 | Matsui |
| 2006/0050877 A1 | 3/2006 | Nakamura |
| 2006/0143453 A1 | 6/2006 | Imamoto et al. |
| 2006/0156018 A1 | 7/2006 | Lauer et al. |
| 2006/0224784 A1* | 10/2006 | Nishimoto ............ G06F 3/0611 710/36 |
| 2006/0248278 A1* | 11/2006 | Beeston ............... G06F 3/0613 711/137 |
| 2007/0177737 A1 | 8/2007 | Jung et al. |
| 2007/0180255 A1 | 8/2007 | Hanada et al. |
| 2007/0186112 A1 | 8/2007 | Perlin et al. |
| 2007/0226488 A1 | 9/2007 | Lin et al. |
| 2007/0255943 A1 | 11/2007 | Kern et al. |
| 2008/0270706 A1* | 10/2008 | Fair ..................... G06F 3/061 711/137 |
| 2009/0259838 A1 | 10/2009 | Lin |
| 2009/0307783 A1 | 12/2009 | Maeda et al. |
| 2010/0008509 A1 | 1/2010 | Matsushita et al. |
| 2010/0198972 A1 | 8/2010 | Umbehocker |
| 2010/0296652 A1 | 11/2010 | Nakayama et al. |
| 2010/0325713 A1 | 12/2010 | Kurita et al. |
| 2011/0055578 A1 | 3/2011 | Resch |
| 2011/0078549 A1 | 3/2011 | Thueringer et al. |
| 2011/0258378 A1* | 10/2011 | Ananthanarayanan . G06F 3/061 711/114 |
| 2011/0276495 A1 | 11/2011 | Varadarajan et al. |
| 2011/0302417 A1 | 12/2011 | Whillock et al. |
| 2012/0036357 A1 | 2/2012 | Struik |
| 2012/0130874 A1 | 5/2012 | Mane et al. |
| 2012/0131341 A1 | 5/2012 | Mane et al. |
| 2013/0041872 A1 | 2/2013 | Aizman et al. |
| 2013/0054976 A1 | 2/2013 | Brown et al. |
| 2013/0254246 A1 | 9/2013 | Lipcon et al. |

OTHER PUBLICATIONS

Cheng, Security Attack Safe Mobil and Cloud-Based One-Time Password Tokens Using Rubbing Encryption Algorithm, ACM, Jun. 2011, pp. 304-336.

Corbett et al., "Spanner: Google's Globally Distributed Database," Transactions on Computer Systems (TOCS), vol. 31, No. 3, 14 pp. Aug. 2013.

Du et al., "A Pairwise Key Predistribution Scheme for Wireless Sensor Networks," ACM, May 2005, vol. 8 Issue 2, pp. 228-258.

Kim et al., Design and Implementation of a Private and Public Key Crypto Processor and Its Application to a Security System, IEEE, Feb. 2004, vol. 50, Issue 1, pp. 214-224.

Lamport, L., "Time, clocks, and the ordering of events in a distributed system," Communications of the ACM, vol. 21, No. 7, pp. 558-565, Jul. 1978.

Non-Final Office Action for U.S. Appl. No. 13/362,695, mailed Apr. 29, 2013, 23 pgs.

Stoller,S.D., "Detecting global predicates in distributed systems with clocks," Distributed Computing, vol. 13, No. 2, pp. 85-98, Feb. 2000.

Ko et al., "A Study of Encryption Algorithm for RFID tag (SEED: 8 Rounds X 64 bit block)," IEEE, 2008, pp. 672-677.

* cited by examiner

DATA PROCESSING PERFORMANCE ENHANCEMENT IN A DISTRIBUTED FILE SYSTEM

CROSS-REFERENCE TO RELATED APPLICATION(S)

The present application is a continuation of U.S. patent application Ser. No. 13/426,466 filed Mar. 21, 2012, which is hereby incorporated herein by reference in its entirety.

BACKGROUND OF THE DISCLOSURE

Technical Field

The present disclosure relates generally to distributed computing, and more specifically, to techniques for enhancing the performance of a distributed file system in a computer cluster.

Description of Related Art

Increasingly large amounts of data are generated every day online by users interacting with one another, with applications, data, websites, etc. Although distributed computing has been adopted for management analysis of large amounts of data, continuous optimizations to improve system performance remains critical to keep up with the rapidity with which data is being generated.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase in "one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for enhancing data processing performance in a distributed file system.

Figure 1:
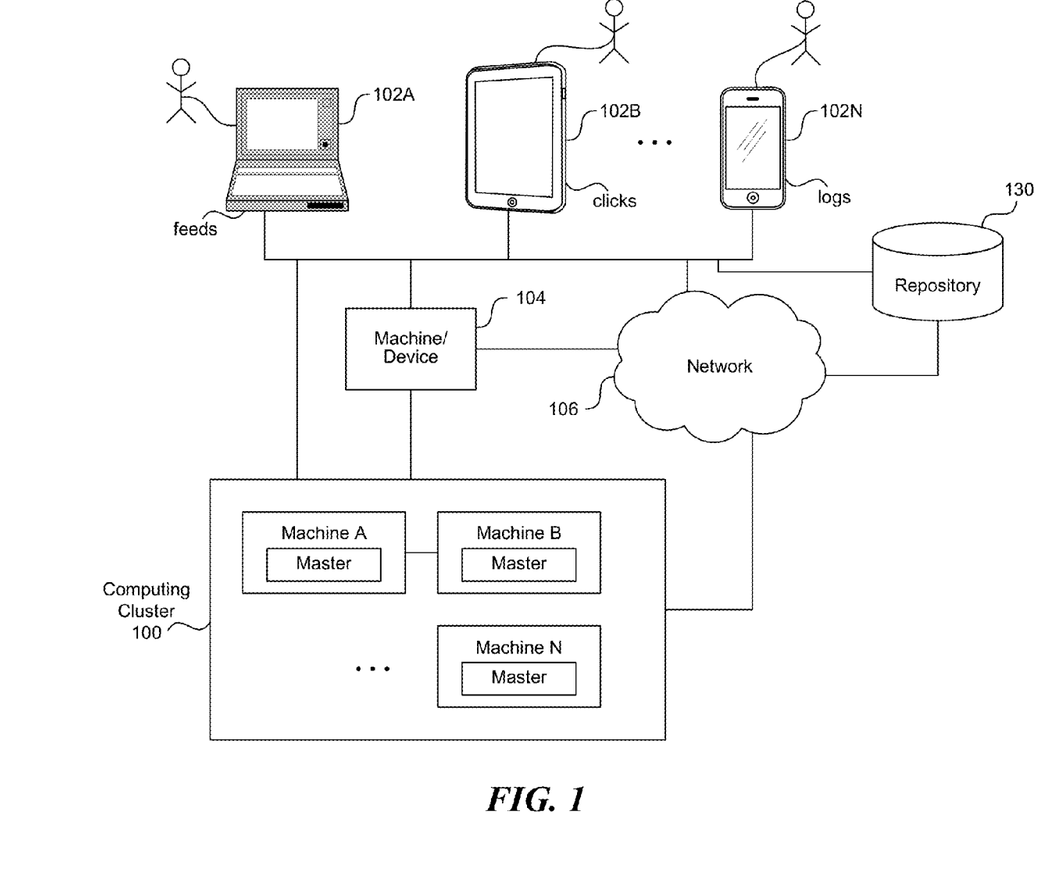
FIG. 1 illustrates a block diagram of client devices that generate datasets (log data) to be collected for storage and processing via interacting nodes in various tiers in the computing cluster, in some instances, through a network.

FIG. 1 illustrates a block diagram of client devices 102A-N that generate datasets (log data) to be collected for storage and processing via interacting nodes in various tiers in the computing cluster 100, in some instances, through a network 106.

The client devices 102A-N can be any system and/or device, and/or any combination of devices/systems that is able to establish a connection with another device, a server and/or other systems. The client devices 102A-N typically include display or other output functionalities to present data exchanged between the devices to a user. For example, the client devices and content providers can be, but are not limited to, a server desktop, a desktop computer, a thin-client device, an internet kiosk, a computer cluster, a mobile computing device such as a notebook, a laptop computer, a handheld computer, a mobile phone, a smart phone, a PDA, a Blackberry device, a Treo, a tablet, an iPad, a thin client, and/or an iPhone, etc. In one embodiment, the client devices 102A-N are coupled to a network 106. In some embodiments, the client devices may be directly connected to one another.

In one embodiment, users interact with user devices 102A-N (e.g., machines or devices). As a results of the user interaction, the devices 102A-N can generate datasets such as log files to be collected and aggregated. The file can include logs, information, and other metadata about clicks, feeds, status updates, data from applications, and associated properties and attributes.

User devices 102A-N can have nodes executing or running thereon that collect the datasets that are user-generated or machine-generated, for example, based on user-interaction with applications or websites running on the devices. Such nodes can interact and/or communicate with one or more other nodes (e.g., either running on the same device/machine or another device/machine (e.g., machine/device 104) to facilitate collection and aggregation of datasets thus generated. In one embodiment, the datasets are eventually written to a file and stored, for example, in storage (e.g., repository 130) on a physical disk.

Additionally, functionalities and properties can be assigned to the nodes such that various analytics can be performed on the collected dataset and additional information can be extracted or embedded. The dataflow among nodes can be configured at a master node. In one embodiment, the nodes executed on the machines 102 or 104 can contact the master(s) to obtain configuration information, which have been set by default or configured by a user The master can be executed on the same devices 102A-N, 104, or at the computing cluster 100. One or multiple masters can be involved in the mapping of data flow among the nodes and various machines.

The repository 130 may be managed by a file system. The file system can be distributed (e.g., the Hadoop Distributed File System (HDFS)). Results of any analytics performed by the machines 104 and/or the computing cluster 100 can also be written to storage. Data/metadata extracted from the collected dataset may be written to storage 130 as well.

The network 106, over which the client devices 102A-N, 104, host, and the nodes and masters therein communicate may be a telephonic network, an open network, such as the Internet, or a private network, such as an intranet and/or the extranet. For example, the Internet can provide file transfer, remote log in, email, news, RSS, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices, host server, and may appear as one or more networks to the serviced systems and devices. In one embodiment, communications to and from the client devices 102A-N can be achieved by, an open network, such as the Internet, or a private network, such as an intranet and/or the extranet. In one embodiment, communications can be achieved by a secure communications protocol, such as secure sockets layer (SSL), or transport layer security (TLS).

The term "Internet" as used herein refers to a network of networks that uses certain protocols, such as the TCP/IP protocol, and possibly other protocols such as the hypertext transfer protocol (HTTP) for hypertext markup language (HTML) documents that make up the World Wide Web (the web). Content is often provided by content servers, which are referred to as being "on" the Internet. A web server, which is one type of content server, is typically at least one computer system which operates as a server computer system and is configured to operate with the protocols of the World Wide Web and is coupled to the Internet. The physical connections of the Internet and the protocols and communication procedures of the Internet and the web are well known to those of skill in the relevant art. For illustrative purposes, it is assumed the network 106 broadly includes anything from a minimalist coupling of the components illustrated in the example of FIG. 1, to every component of the Internet and networks coupled to the Internet.

In addition, communications can be achieved via one or more wireless networks, such as, but is not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The client devices 102A-N can be coupled to the network (e.g., Internet) via a dial up connection, a digital subscriber loop (DSL, ADSL), cable modem, and/or other types of connection. Thus, the client devices 102A-N can communicate with remote servers (e.g., web server, host server, mail server, and instant messaging server) that provide access to user interfaces of the World Wide Web via a web browser, for example.

The repository 130 can store software, descriptive data, images, system information, drivers, collected datasets, aggregated datasets, log files, analytics of collected datasets, enriched datasets, user data, metadata, etc. The repository may be managed by a database management system (DBMS), for example but not limited to, Oracle, DB2, Microsoft Access, Microsoft SQL Server, MySQL, FileMaker, etc.

The repositories can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

In one embodiment, the repository 130 is managed by a distributed file system or network file system that allows access to files from multiple hosts/machines over a network. The distributed file system can include by way of example, the Hadoop Distributed File system (HDFS). Other file systems can be used as well, for example, through integration of Hadoop's interface which provides an abstraction layer for the file system. For example, a local file system where a node resides can be used. The HDFS native distributed file system can also be used. In addition, S3 (a remote file system hosted by Amazon web services), FTP, and KFS (Kosmos file system—another distributed file system) can also be used. Clients can also write to network file systems (NFS), or other distributed file systems.

Figure 7:
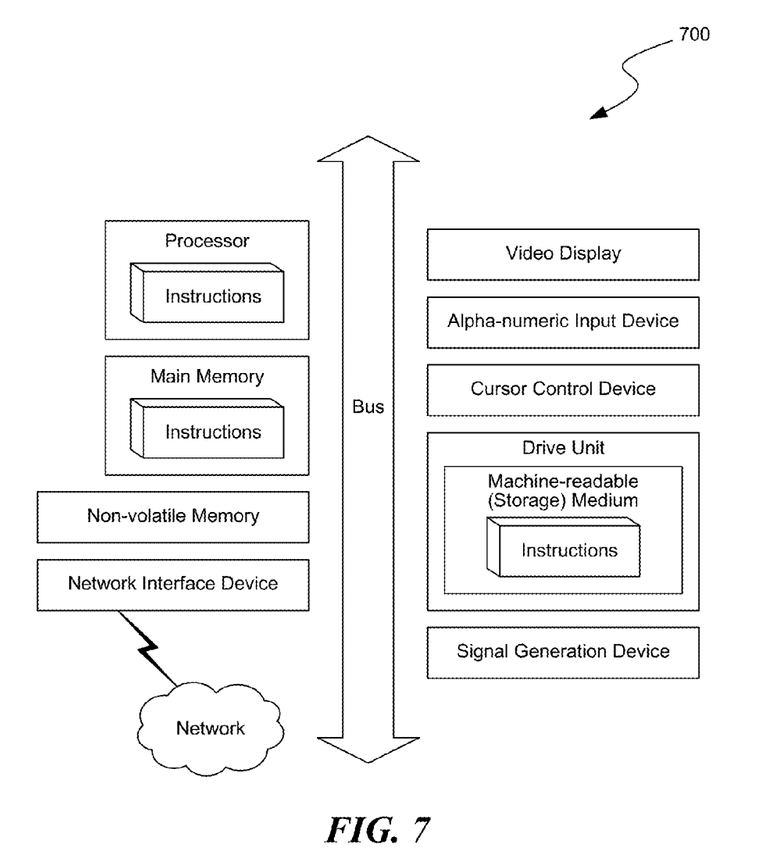
FIG. 7 shows a diagrammatic representation of a machine in the example form of a computer system within which a set of instructions, for causing the machine to perform any one or more of the methodologies discussed herein, may be executed.

In general, the user devices 102 and 104 are able to write files (e.g., files including by way of example, collected and aggregated datasets/logs/log files) to the repository 130, either through the network 106 or without utilizing the network 106. Any device 102 or machine 104, or a machine in the machine cluster 100 can be implemented on a known or convenient computer system, such as is illustrated in FIG. 7.

Figure 2A:
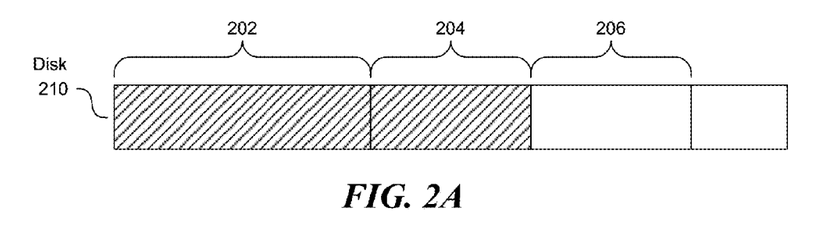
FIG. 2A depicts sections of a disk from which readahead can be performed for sequential read requests by the I/O scheduler.

FIG. 2A depicts sections of a disk 210 from which readahead can be performed for sequential read requests by the I/O scheduler.

Sequential read requests can be optimized for reads and writes in large scale data processing systems (e.g., systems like Hadoop MapReduce, Apache Hive, Apache Pig, etc.). For example, for a sequential read of disk 210 to read datablock 202, readahead of data blocks 204 and/or 206, and or later data blocks can be proactively triggered. The proactive triggering causes the readaheads to be deterministically performed in lieu being of heuristically performed thus allowed the readahead to be performed quicker than it otherwise would, thus enhancing system performance. In distributed file systems where a large portion of the read commands are part of sequential reads of large files (e.g., data chunks between 1-5 MB or 5-10 MB, >10 MB, >50 MB, >100 MB, or more generally on the order of 100's MB), automatic readahead can significantly reduce read time and system through put by allowing the disk to seek less (e.g., the underlying disk hardware sees larger units of reads/writes). This allows the system to handle more concurrent streams of data given the same hardware resources.

Figure 2B:
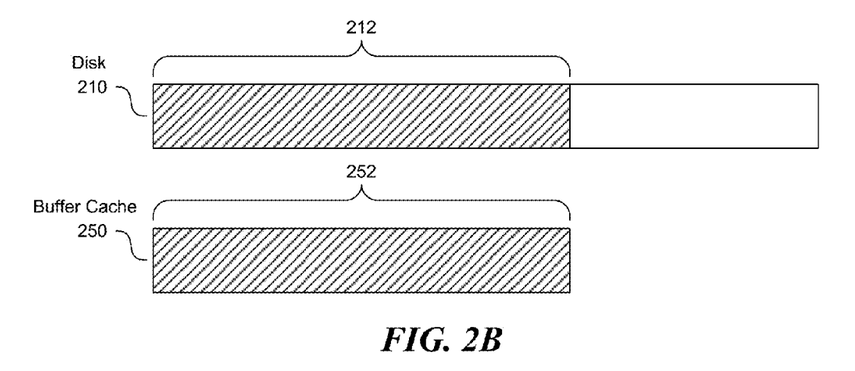
FIG. 2B depicts a portion of the cache with buffered data written to or read from the disk that can be dropped by the I/O scheduler.

FIG. 2B depicts a portion of the cache 250 with buffered data 252 written to or read from the disk 210 that can be dropped by the I/O scheduler.

The OS can be instructed to purged data out of buffer cache after writing to the disk or performing sequential reads from the disk. Some operating systems by default will automatically buffer recently read/written data to optimize a re-read or re-write that occurs after the read/write. However, in systems such as a distributed file system or the Hadoop distributed file system or other applications where the files being read/written are large, this caching becomes an overhead. As such, in this application, the I/O scheduler is explicitly instructed to purge the buffered data 252 which was cached in 250 as a result of the data 212 in disk 210 being read/written. Another advantage of purging the buffer cache frees up the buffer cache for other more useful uses—in the MapReduce example, the "intermediate output files" can now use the buffer cache more effectively. Therefore, purging the buffer cache speeds up the system by enabling other processes to use the buffer.

Figure 2C:
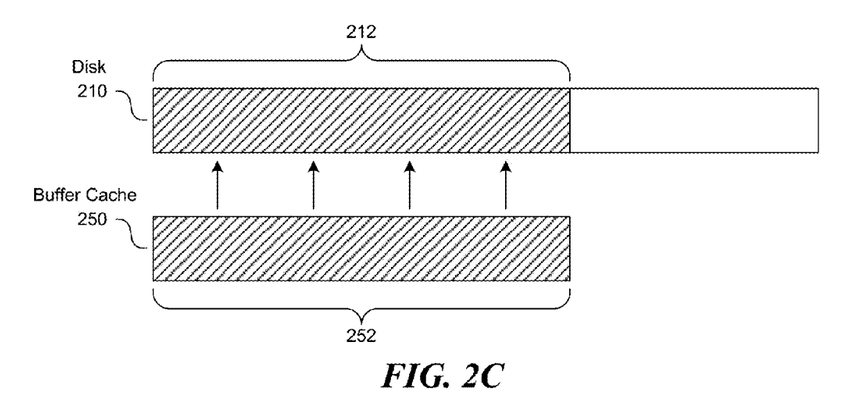
FIG. 2C depicts buffer cached written data being immediately flushed to disk.

FIG. 2C depicts buffer cached 250 written data 252 being immediately flushed to disk 210.

The immediate flushing eliminates the delay that is implemented by default in I/O schedulers of some operating systems to support re-writes of the written data (e.g., the written data 252 stored in the buffer cache 250). However, in a distributed file system (e.g., Hadoop distributed file system) where re-writes are not supported, the written data 252 is immediately flushed from the buffer cache 250 to the disk 210 to enhance performance by decreasing write time. The written data then occupies storage location 212 in the disk 210. In one embodiment, this is performed by instructing the operating system to drop all data from offset 0 through the beginning of the current window (a data chunk of a predetermined size (e.g., 8 MB) preceding a current offset that is being written to in the file). In addition, the system also instructs the OS to drop the data in the current window (or the preceding 8 MB of written data) from the cache. The window size to drop cached data can be 8 MB (e.g., the size of the 'current window') can be larger or smaller (e.g., 1 MB, 2 MB, 16 MB, 32 MB, 64 MB, or larger).

Figure 3A:
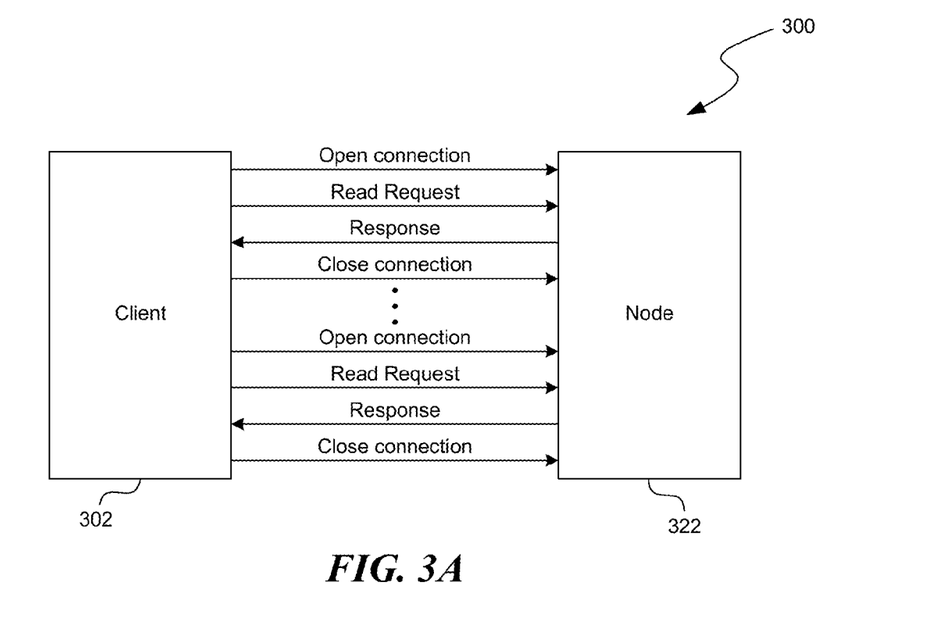
FIG. 3A depicts a diagram of a single request being processed in a single connection between a client and a data node.
Figure 3B:
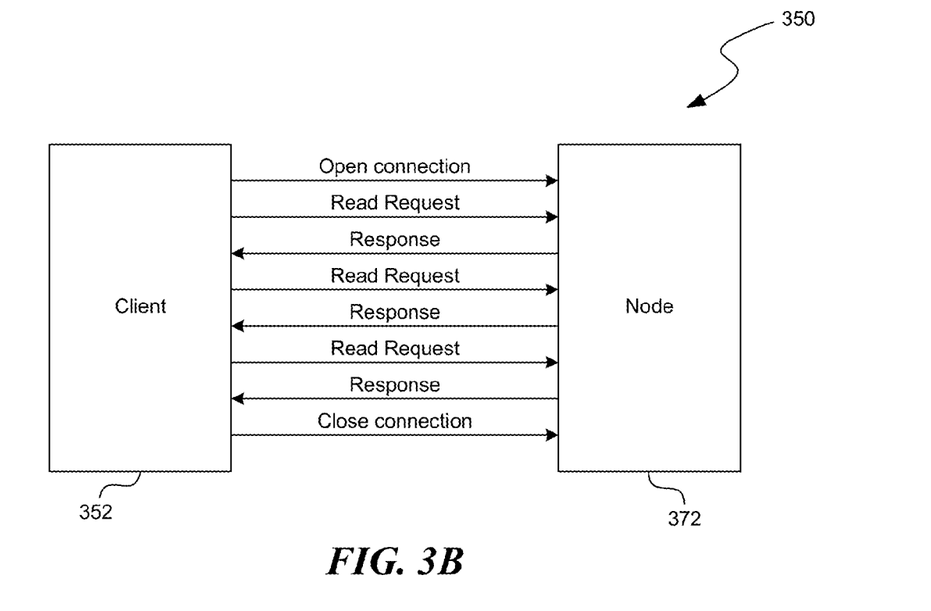
FIG. 3B depicts a diagram of multiple requests being processed in a single connection.

FIG. 3A depicts a diagram 300 of a single request being processed in a single connection between a client 302 and a data node 322. For example, each read request is sent over different connections between the client 302 and the data node 322. In the case that an operation leaves the stream in a well-defined state (e.g., a client reads to the end of the requested region of data) the same connection could be reused for a second operation. For example, in the random read case, each request is usually only ~64-100 KB, and generally not entire blocks. This optimization improves random read performance significantly. The optimization for random read performance enhancement is illustrated in FIG. 3B where an established connection between a client 352 and the data node 372 is held open for one read operation and for a subsequent read operation. FIG. 3B depicts a diagram of multiple requests being processed in a single connection.

Figure 4:
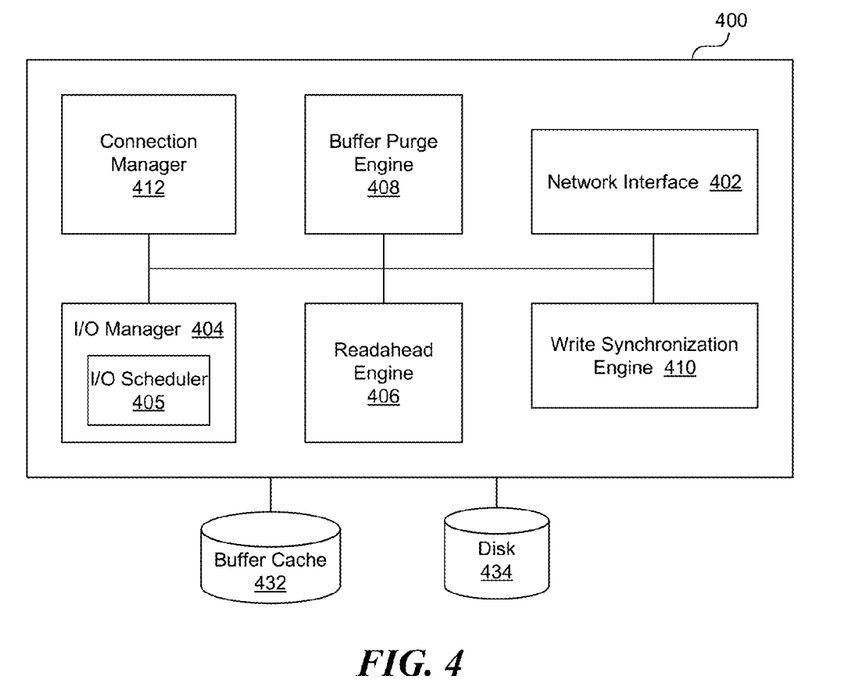
FIG. 4 depicts an example block diagram of the components of a machine in machine cluster able to enhance the performance of data processing by the distributed file system.

FIG. 4 depicts an example block diagram of the components of a machine 400 in a machine cluster having components able to enhance data processing performance of the distributed file system.

The machine 400 can include, a network interface 402, an I/O manager 404 having an I/O scheduler 405, a readahead engine 406, a buffer purge engine 408, a write synchronization engine 410, and/or a connection manager 412. Additional or less modules/components may be included.

As used in this paper, a "module," a "manager", a "handler", or an "engine" includes a dedicated or shared processor and, typically, firmware or software modules that are executed by the processor. Depending upon implementation-specific or other considerations, the module, manager, hander, or engine can be centralized or its functionality distributed. The module, manager, hander, or engine can include special purpose hardware, firmware, or software embodied in a computer-readable medium for execution by the processor. As used in this paper, a computer-readable medium or computer-readable storage medium is intended to include all mediums that are statutory (e.g., in the United States, under 35 U.S.C. §101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

The machine 400 receives and processes client requests through the network interface 402. The machine 400 can also interact with other machines in a computing cluster and/or with disks (e.g., disk 434) over the network interface 402. In general, computing cluster which the machine 400 is a part of, is a distributed file system cluster (e.g., Hadoop distributed file system). The machine 400 can include a processor (not illustrated), a disk 434, and memory having stored there on instructions which when executed by the processor, is able to perform various optimization techniques in enhancing data processing performance in the distributed file system, for example, by way of the I/O manager 404 and/or the connection manager 412.

In one embodiment, the readahead engine 406 can be managed by the I/O manager 404 or scheduler 405 to proactively trigger readaheads for sequential read requests or any other read requests, whether or not it can be determined that the read is part of a sequential read (as shown in the diagram of FIG. 2A). The write synchronization engine 410 can, for example, commit the written data to disk 434 immediately by eliminating any delay between when a write is performed and when written data from the write is flushed from the buffer 432 to the disk (as shown in the diagram of FIG. 2B). In one embodiment, the buffer purge engine 408 can actively purge data out of buffer cache 432 after writing to the disk 434 or performing sequential reads from the disk 434, for example, at the instruction of the I/O manager 404 (as shown in the diagram of FIG. 2C).

In one embodiment, the connection manager 412 is able to manage connections of the machine 400 with clients and optimize the performance of random reads by a client. For example, for a given client, the connection manager 412 can optimize random read performance of data on the disk 434 by holding an established connection between a client and the machine 400 used for one operation for one or more subsequent operations (as example of this process is illustrated in the example of FIG. 3B).

In one embodiment, the distributed file system performance is further enhanced by decreasing checksum overhead in speeding up the distributed file system read path. This can be implemented by performing the checksum in hardware (e.g., by a processor supporting CRC 32). In some instances, the checksum implementation can be modified to use zlib polynomial from iSCSI polynomial. For example, the specific optimization can be switched from using CRC32 to CRC32C such that hardware support in SSE4.2-enabled processors could be taken advantage of.

This and other modules or engines described in this specification are intended to include any machine, manufacture, or composition of matter capable of carrying out at least some of the functionality described implicitly, explicitly, or inherently in this specification, and/or carrying out equivalent functionality.

Figure 5A:
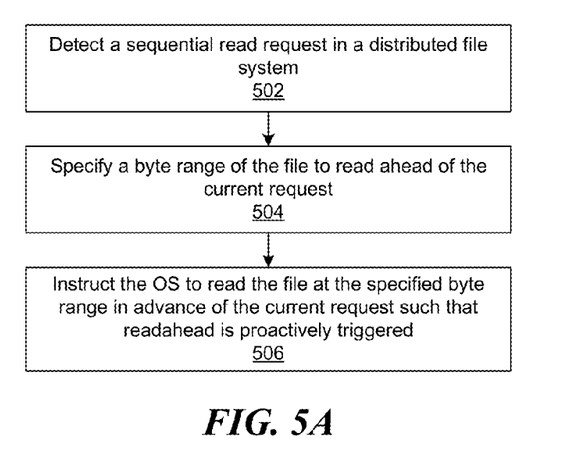
FIG. 5A depicts a flowchart of an example process for deterministically instructing readahead in a sequential read request.

FIG. 5A depicts a flowchart of an example process for deterministically instructing readahead in a sequential read request.

In process 502, a sequential read request is detected in a distributed file system. When a read request is detected in DFS or the Hadoop distributed file system, operating system calls (e.g., Linux calls) can be invoked to proactively trigger readaheads in response to the read request. The proactive triggering causes the readaheads to be deterministically performed in lieu of being heuristically performed, for example, by the operating system. In some cases, operating systems may have heuristics for detecting sequential reads from random reads and apply readahead in the case that certain criteria is met based on observations of multiple read requests. By performing deterministic trigger, this ensures that readahead is initiated and that it is initiated with minimal time delay resulting from the need apply the heuristics before deciding to readahead.

To proactively trigger readaheads, in Linux or Unix-based operating systems or other systems conforming to (or partially conforming to) the POSIX.1-2001 standard, the posix_fadvise( ) call can be used with the POSIX_FADV_WILL-NEED flag to indicate data also expected in the future based on the current read request. In other operating systems, any command which allows an application to tell the kernel how it expects to use a file handle, so that the kernel can choose appropriate read-ahead and caching techniques for access to the corresponding can be used to trigger proactive readahead.

In process 504, a byte range of the file to read ahead of the current request is specified. In process 506, the OS is instructed to read the file at the specified byte range in advance of the current request. An example of readahead data sets to be read in advance of the data requested in a given read command is illustrated in the example of FIG. 2A.

The specified byte range can be predetermined, set by default, dynamically adjusted/determined, and/or (re) configurable by a client or system administrator, or a master node in the cluster. In one embodiment, given that any read request in the Hadoop distributed file system is likely a sequential read request, the proactive readahead is typically performed/requested to proactively retrieve data from the disk in advance of subsequent requests to speed up reads from HDFS.

Figure 5B:
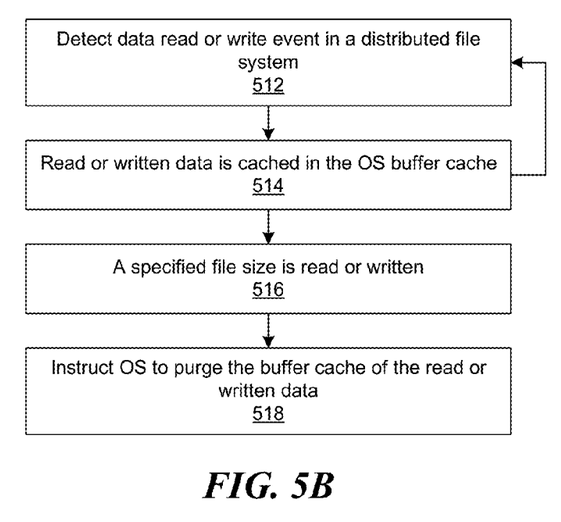
FIG. 5B depicts a flowchart of an example process for dropping the buffer cache behind writes and sequential reads.

FIG. 5B depicts a flowchart of an example process for dropping the buffer cache behind writes and sequential reads.

In process 512, data read or write event is detected in a distributed file system. Upon a read or write event, operating system calls (e.g., operating system calls which are native to the operating system) can be invoked to optimize cache management by an I/O component. In one embodiment, the cache management is optimized for reads and writes in Hbase or for large sequential reads and writes. In general, sequential read requests can be optimized for reads and writes in large scale data processing systems (including by way of example systems like Hadoop MapReduce, Apache Hive, Apache Pig, etc.) "Large" sequential reads and writes, in general, can include reads and writes of data chunks between 1-5 MB or 5-10 MB, >10 MB, >50 MB, or in the 100's MB range, or data chunks greater than 500 kB, or data chunks greater than ~250 kB, depending on the application or system resources/availability. In one embodiment, if a read is larger than a threshold size (e.g., 256 KB), readahead is performed. However, the readahead will generally not pass the client's requested boundary. For example: if a client requests bytes 0 through 256 MB the system can readahead 4 MB chunks ahead of the reader's current position, as the reader streams through the file, if a client requests bytes 0 through 1 MB, the system will readahead only 1 MB (even if the file itself is larger than 1 MB).

In process 514, read or written data is cached in the OS buffer cache. In general, the operating system will automatically cache read or written data into the buffer assuming that there will be subsequent commands to re-read the previously read or written data. A diagram showing read or written data in the disk and the corresponding cached data in the buffer is illustrated in the example of FIG. 2B.

In process 516, when it is detected that a specified file size has been read or written (e.g., on the order of 1 MB, 2 MB, 4 MB, or >10 MB, for example), in process 518, the OS is instructed to purge the buffer cache of the read or written data. In one embodiment, the data size of the data that is purged from the buffer cache is configurable or dynamically adjustable. For example, data size of the data that is purged from the buffer cache can be between 4-8 MB, 8-16 MB, 16-32 MB, or other sizes.

Figure 5C:
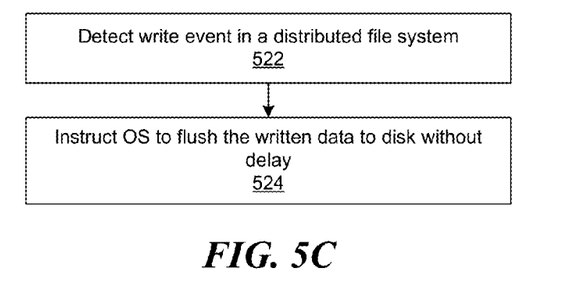
FIG. 5C depicts a flowchart of an example process for immediate flush of written data to disk.

FIG. 5C depicts a flowchart of an example process for immediate flush of written data to disk.

In process 522, a write event is detected in a distributed file system. In general, in some operating systems, the I/O scheduler will automatically hold the written data in the buffer cache for some amount of time (e.g., 10-40 seconds) before writing (e.g., committing or flushing) the written data to the disk. This can be an optimization technique in the event that frequent rewrites occur such that one write can be performed instead of writing and rewriting the data to the disk multiple times in the event of re-writes.

In a distributed file system such as the Hadoop distributed file system or other file systems where re-writes are not allowed or not supported, this delay in committing data to the disk becomes an overhead since it unnecessarily occupies the cache and slows the write event. Therefore, in one embodiment, to enhance data processing performance, in process 524, the OS is instructed to flush the written data to disk without delay. Therefore, in operation, a write event can be expedited since the delay between when a write is performed and when written data from the write is flushed to the disk from the buffer cache is now eliminated. Another advantage of purging the buffer cache frees up the buffer cache for other more useful uses—in the MapReduce example, the "intermediate output files" can now use the buffer cache more effectively. Therefore, purging the buffer cache speeds up the system by enabling other processes to use the buffer.

In Linux, the SYNC FILE RANGE command can be used with a specified file byte size range to instruct the I/O scheduler to immediately start flushing the data to the disk. The "msync" API can be used along with the MS_ASYNC flag for a similar implementation on other systems conforming to POSIX.1-2001. This will enable the I/O scheduler to also expedite the scheduling of subsequent writes without delay and overhead cache use. A diagram showing flushing of written data to disk is depicted in the example of FIG. 2C.

Figure 6:
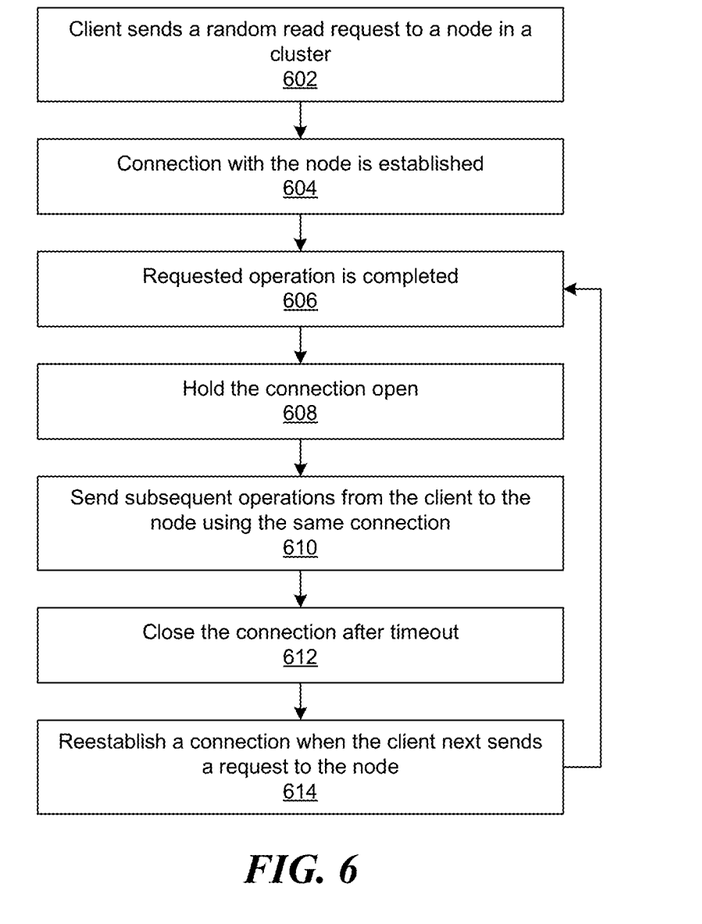
FIG. 6 depicts a flowchart of an example process for reusing a connection for multiple client requests at a data node.

FIG. 6 depicts a flowchart of an example process for reusing a connection for multiple client requests at a datanode to optimize a distributed file system for random read performance.

The random read performance can be optimized by holding an established connection with the given machine used for one read operation for a subsequent read operation. In general, random read performance can be optimized for reading data that is less than 50 kB, less than 100 kB, or less than 1 MB. In process 602, a client sends a random read request to a node in a cluster. In process 604, a connection with the node is established. In process 606, the operation which was requested by the client is completed.

In process 608, the connection is held open, for example, in the case that an operation leaves the stream in a well-defined state (e.g., if a client successfully reads to the end of a block), for use by additional operations. A well-defined state is any state in which the server is able to successfully respond to the entirety of the request, and the client fully reads the response from the server. An example of an undefined state is if the client initially requests to read 3 MB, but then only reads 1 MB of the response. At that point, it can't issue another request because there is still data coming across the pipe. Another example of an unclean state is if the client receives a timeout or another error. In the case of an error, the connection is closed and a new one is established.

In process 610, subsequent operations are sent from the client to the node using the same connection. In process 612, the connection is closed after timeout. In one embodiment, the client and the given machine have same or similarly configured timeouts. For example, the established connection is held for 0.5-1 seconds, 1-2, seconds, or 2-5 seconds for optimization of the random read performance, such that all requests from the client to the same machine within the timeout period can use the same connection. In one embodiment, the timeout is measured from the end of the last successful operation. In process 614, a connection is re-established when the client next sends a request to the node, and the process can continue at step 606. A diagrammatic example of using a single connection for multiple operations between a client and a data node is illustrated in the example of FIG. 3B.

FIG. 7 shows a diagrammatic representation of a machine in the example form of a computer system within which a set of instructions, for causing the machine to perform any one or more of the methodologies discussed herein, may be executed.

In the example of FIG. 7, the computer system or machine 700 includes a processor, memory, disk, non-volatile memory, and an interface device. Various common components (e.g., cache memory) are omitted for illustrative simplicity. The computer system 700 is intended to illustrate a hardware device on which any of the components depicted in the example of FIG. 1 (and any other components described in this specification) can be implemented. The computer system or machine 700 can be of any applicable known or convenient type. The components of the computer system 700 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 900. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1900. The interface can include an analog modem, isdn modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 7 reside in the interface.

In operation, the machine 700 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, 6 will begin with the words "means for".) Accordingly, the applicant reserves the right to add additional claims after filing the application to pursue such additional claim forms for other aspects of the disclosure.

What is claimed is:

1. A method for enhancing performance for data processing in a distributed file system, the method comprising:
   instantiating an input/output (I/O) manager on a machine among a plurality of machines that implement the distributed file system; and
   utilizing the I/O manager to perform cache management optimization selected from the group consisting of (a) deterministically triggering readaheads for all sequential read requests by overriding a heuristic for the readaheads on the machine; (b) instructing the machine to invalidate cached data in a buffer upon detecting that a specific size of data has been automatically cached; and (c) overriding a time delay configured on the machine so that the machine is to commit data from the buffer to a disk without the time delay.

2. The method of claim 1, wherein deterministically triggering readaheads is performed in response to determining that the machine employs the heuristic for triggering readaheads for sequential read requests.

3. The method of claim 1, wherein instructing the machine to invalidate cached data is performed in response to determining that the machine is configured to automatically cache data into the buffer on the machine after the data is accessed.

4. The method of claim 1, wherein overriding a time delay configured on the machine is performed in response to determining that the machine is configured to include the time delay before committing data.

5. The method of claim 1, further comprising dynamically adjusting an amount of the readaheads for sequential read requests based on the sequential read requests.

6. The method of claim 1, wherein the method further comprising:
instantiating a connection manager on the machine, wherein the connection manager is configured to instruct the machine perform steps including:
upon receiving an access request from a client, establishing a connection with a node associated with the access request in response to the access request;
determining that the access request is associated with data that is smaller than a select size;
detecting whether operations requested by the access request have been completed;
after the operations requested by the access request have been completed, holding the connection with the node open for a select time period,
receiving, by the connection manager from the client, a subsequent access request that is associated with the node associated with the access request before the select time period expires; and
performing operations requested by the subsequent access request through the held open connection.

7. The method of claim 1, wherein data size of the data that is invalidated from the buffer is configurable or dynamically adjustable.

8. The method of claim 1, wherein data size of the data that is invalidated from the buffer is between 4-8 MB or 8-16 MB.

9. The method of claim 1, wherein the cache management optimization are performed through operating system calls are native to an operating system running on the machine.

10. The method of claim 1, further comprising decreasing a checksum overhead in a read path of the distributed file system by modifying a polynomial that is used in generating the checksum.

11. The method of claim 9, wherein the checksum is performed in hardware by a processor supporting CRC32.

12. The method of claim 1, wherein the operating system conforms to POSIX.1-2001.

13. The method of claim 1, wherein the distributed file system is a Hadoop distributed file system.

14. A system for distributed computing, the system comprising:
a set of machines forming a distributed file system cluster,
a given machine in the set of machines having:
a processor;
a disk;
memory having stored there on instructions which when executed by the processor, causes the given machine to perform:
instantiating an input/output (I/O) manager to perform cache management optimization selected from the group consisting of (a) deterministically triggering readaheads for all sequential read requests by overriding a heuristic for the readaheads on the machine; (b) instructing the machine to invalidate cached data in a buffer upon detecting that a specific size of data has been automatically cached; and (c) overriding a time delay configured on the machine so that the machine is to commit data from the buffer to a disk without the time delay.

15. The system of claim 14, wherein the given machine is further caused to perform:
instantiating a connection manager on the machine, wherein the connection manager is configured to instruct the machine perform steps including:
upon receiving an access request from a client, establishing a connection with a node associated with the access request in response to the access request;
determining that the access request is associated with data that is smaller than a select size;
detecting whether operations requested by the access request have been completed;
after the operations requested by the access request have been completed, holding the connection with the node open for a select time period,
receiving, by the connection manager from the client, a subsequent access request that is associated with the node associated with the access request before the select time period expires; and
performing operations requested by the subsequent access request through the held open connection.

16. The system of claim 14, wherein the connection is held open for 0.5-1 seconds, 1-2, seconds, or 2-5 seconds.

17. The system of claim 14, wherein the given machine is further caused to perform dynamically adjusting an amount of the readaheads for sequential read requests based on the sequential read requests.

18. The system of claim 14, wherein the distributed file system is a Hadoop distributed file system (HDFS).

19. The system of claim 14, wherein the cache management is optimized for reads and writes in Hbase or MapReduce.

20. The system of claim 14, wherein the given system is further cased to perform:
decreasing checksum overhead in a read path of the distributed file system by modifying a polynomial that is used in generating the checksum.

21. A method for enhancing performance for data processing in a distributed file system, the method comprising:
instantiating an input/output (I/O) manager on a machine among a plurality of machines that implement the distributed file system;
utilizing the I/O manager to perform cache management optimization, the cache management optimization including: deterministically instructing readahead in a sequential read request, dropping a buffer cache behind writes and sequential reads, and/or immediately flushing written data to disk; and
instantiating a connection manager on the machine, wherein the connection manager is configured to instruct the machine perform steps including:
upon receiving an access request from a client, establishing a connection with a node associated with the access request in response to the access request;
determining that the access request is associated with data that is smaller than a select size;
detecting whether operations requested by the access request have been completed;
after the operations requested by the access request have been completed, holding the connection with the node open for a select time period,
receiving, by the connection manager from the client, a subsequent access request that is associated with the node associated with the access request before the select time period expires; and
performing operations requested by the subsequent access request through the held open connection.

* * * * *

UNITED STATES PATENT AND TRADEMARK OFFICE
CERTIFICATE OF CORRECTION

PATENT NO. : 9,600,492 B2
APPLICATION NO. : 15/225533
DATED : March 21, 2017
INVENTOR(S) : Todd Lipcon Page 1 of 1

It is certified that error appears in the above-identified patent and that said Letters Patent is hereby corrected as shown below:

On the Title Page

In item (57), in Column 2, in "Abstract", Line 8, delete "desk;" and insert -- disk; --, therefor.

In the Specification

In Column 5, Lines 33-34, delete "and or" and insert -- and/or --, therefor.

In the Claims

In Column 16, Line 21, in Claim 16, delete "1-2," and insert -- 1-2 --, therefor.

Signed and Sealed this
Thirteenth Day of June, 2017

Joseph Matal
*Performing the Functions and Duties of the
Under Secretary of Commerce for Intellectual Property and
Director of the United States Patent and Trademark Office*